United States Patent [19]

Parulski et al.

[11] Patent Number: 5,109,273
[45] Date of Patent: Apr. 28, 1992

[54] SIGNAL PROCESSING CIRCUIT FOR PERFORMING A PIPELINED MATRIX MULTIPLICATION UPON SIGNALS FROM SEVERAL LINEAR SENSORS

[75] Inventors: Kenneth A. Parulski; William A. Cook; Lionel J. D'Luna, all of Rochester, N.Y.

[73] Assignee: Eastman Kodak Company, Rochester, N.Y.

[21] Appl. No.: 522,439

[22] Filed: May 11, 1990

[51] Int. Cl.$^5$ .............................................. H04N 1/46
[52] U.S. Cl. ......................................... 358/78; 358/80
[58] Field of Search ................... 358/80, 78, 27, 30

[56] References Cited

U.S. PATENT DOCUMENTS

| | | | |
|---|---|---|---|
| 4,542,402 | 9/1985 | Ader | 358/30 |
| 4,568,967 | 2/1986 | Freyberger et al. | 358/27 |
| 4,686,520 | 8/1987 | Yamaoka | 340/703 |
| 4,731,661 | 3/1988 | Nagano | 358/75 |
| 4,833,533 | 5/1989 | Augusti et al. | 358/80 |
| 4,839,719 | 6/1989 | Hirota et al. | 358/75 |
| 4,841,360 | 6/1989 | Bergmeir | 358/80 |
| 4,866,512 | 9/1989 | Hirosawa et al. | 358/75 |
| 4,954,881 | 9/1990 | Kaye | 358/22 |
| 4,954,889 | 9/1990 | Endo et al. | 358/80 |
| 4,958,221 | 9/1990 | Tsuboi et al. | 358/80 |

FOREIGN PATENT DOCUMENTS

| | | |
|---|---|---|
| 0363146 | 4/1990 | European Pat. Off. |
| 0058378 | 8/1987 | Japan |
| 0049494 | 2/1989 | Japan |

*Primary Examiner*—Leo H. Boudreau
*Assistant Examiner*—Andrew W. Johns

[57] ABSTRACT

A signal processing circuit operates upon digitized signals from a plurality of linear color sensors that are spatially separated in the page scanning direction by a predetermined number of lines. The digitized signals are realigned in a line rephasing circuit, which provides sets of rephased color values for each scanned element of the original. A matrix multiplication is performed in a row sequential process upon the rephased signals by a group of multipliers, one multiplier for each row coefficient of the matrix. Each multiplier receives a rephased signal and a series of coefficients multiplexed into the circuit from a group of row coefficient registers. By clocking the rephased signals at a submultiple of the coefficient rate, a row-sequential matrix operation is serially performed in a pipelined manner.

6 Claims, 6 Drawing Sheets

SIGNAL PROCESSING CIRCUIT FOR PERFORMING A PIPELINED MATRIX MULTIPLICATION UPON SIGNALS FROM SEVERAL LINEAR SENSORS

BACKGROUND OF THE INVENTION

1. Field of the Invention

This invention pertains to the field of digital signal processing and, in particular, to the matrix multiplication of a plurality of digital signals by a coefficient matrix of the type used in color signal processing.

2. Background Art

Linear image sensors are extensively used in image scanners. Applications include hybrid (film/electronic) photographic systems, facsimile and electronic copiers. These linear sensor arrays exist in a variety of resolutions ranging from 2000 to 8000 elements. Linear image scanners generally include a limited amount of real-time digital image processing, such as black correction and gain correction, which are implemented using off-the-shelf digital integrated circuits. One method for obtaining color information is by using three linear arrays, each with a different color filter (R,G,B), integrated on the surface of the sensor. These sensors are spaced apart by an integral number of lines on the same substrate. The page scan direction is perpendicular to the linear arrays, and hence the three channels of information correspond to spatially displaced photosites.

An example of a known film scanning system is shown in FIG. 1. A set of linear sensors 10r, 10g, and 10b are integrated on a substrate 11 and spatially displaced by an integral number, e.g., 8 lines, on the substrate 11. The sensors 10r, 10g and 10b are supported in the imaging plane of an optical system 12, which images respective lines (illuminated by the lamp arrangement 14) from a film image 13a upon the sensors. The film image 13 is one of many on an elongated web 13 of film, which is moved in the direction shown through an optical film gate 15. The analog output signals from the sensors 10r, 10g, 10b are respectively multiplexed into one channel by a multiplexer 16. Due to the eight-line spacing of the sensors, consecutive red, green, and blue samples in the multiplexed stream of signals are actually offset by multiples of eight lines. The multiplexed signals are digitized in an A/D converter 17 and applied to a signal processor 18, where conventional black-level correction, gain correction, and the like, may be accomplished.

Color matrixing can also be used in the signal processor 18 to improve color reproduction, or to provide color space transformation. For instance, a color space transformation matrix is used to convert red, green, and blue video signals into Y (luminance) and R-Y, B-Y (chrominance) signals. A color correction matrix is used to correct the spectral sensitivities of the sensors for the chromaticities of the phosphor set of the particular display in use. Another use is with film-to-video conversion, a process in which a color correction matrix operates on the film scanning signals to correct the film colorimetry for video display.

It is desirable for reasons of space and efficiency to implement the matrix in one, or a few, integrated circuits. A conventional approach is to use an array of multipliers, say nine multipliers, to implement a 3×3 matrix. This uses a prohibitive amount of circuit area (on an integrated circuit). The multipliers can be replaced with ROM (read only memory) look-up tables. This still takes a lot of area. Another approach approximates the matrix coefficients by simple shifting operations, which can be implemented digitally by "hardwired" right (or left) shift connections between registers that provide a "binary" matrix coefficient series, such as 1/32, 1/16, $\frac{1}{8}$, $\frac{1}{4}$, $\frac{1}{2}$, 1, 2, etc.

An improvement to the latter approach is disclosed in Ser. No. 346,861, "A Programmable Digital Circuit for Performing a Matrix Multiplication", filed May 3, 1989 in the names of Kenneth A. Parulski, Robert H. Hibbard and Lionel J. D'Luna, and assigned to the assignee of the present invention. Both the shifts and an arithmetic function are mask programmed in a simple, area-conserving configuration that lends itself to cascading, both for increased accuracy and ease of matrix implementation. The circuit disclosed in Ser. No. 346,861 includes a cascaded array of digital "building blocks" that together implement a matrix multiplication in each channel of a color video signal processing system. A multi-row matrix is obtained by driving several cascaded chains in parallel across a plurality of signal channels. Notwithstanding the advantages, the circuit disclosed in Ser. No. 346,861 is most useful in matrix circuits where less accuracy can be tolerated. For example, it is difficult to achieve 8-bit accuracy merely with bit-shifting and a reasonable number of additive arithmetic functions. Moreover, the increased level of programming needed for greater bit accuracy would lead away from the type of mask programming used in this circuit.

A different approach to programmability is seen in U.S. Pat. No. 4,542,402, "Digital Color Matrix for a Digital Television Receiver,", wherein the values of binary coded coefficients that convert the representation of the color picture information into binary coded color difference signals are stored in a memory accessed by a microprocessor. In response to adjustment of controls such as contrast and tint, the microprocessor modifies the coefficients. The modified coefficients are placed in a digital store such as a latch arrangement, from which they are provided to a pair of multipliers. The multipliers perform a matrix multiplication to develop color difference signals from I and Q color mixture signals obtained from an analog composite video signal. Each I or Q sample applied to the X operand input port of a multiplier is multiplied three times within one cycle of the I or Q-clock to obtain the three I color mixture components and the three Q color mixture components of the R-Y, G-Y, and B-Y color difference signals.

SUMMARY OF THE INVENTION

It is desirable to provide a one-chip solution to the processing needs of linear sensors for high performance scanning applications. Since multipliers are very large circuit elements, it is not unusual for a matrix multiplier circuit to take up a large part, e.g., 50%, of the chip space. We have found that a row sequential pipelined matrix multiplication can be advantageously used in a plural linear scanner application to reduce the required circuitry by almost two-thirds without decreasing the throughput rate. Moreover, the row-sequential matrix can be combined with line rephasing to realign the signals from the spatially-displaced sensors, thereby providing a realigned output in a very small package.

The invention is accordingly configured to operate upon digitized image signals from a plurality of linear color sensors separated by a predetermined number of scan lines. The digitized signals are aligned in a line rephasing circuit, which outputs sets of color values corresponding to scanned elements of the original. Means are provided for storing the matrix coefficient values for an (m×n) order matrix. A multiplier section has first inputs for receiving the rephased, coincident color values and second inputs for receiving the coefficient values. The multiplier is driven at a pixel rate to generate the product of respective values input through the first and second inputs. Means are provided for transferring rows of coefficient values from the storing means to the second input at the pixel rate and for applying the rephased color values to the first input at a submultiple of the pixel rate. In this manner, a row-sequential, pipelined matrix multiplication is serially performed for the m rows upon each selected set of color values, thereby developing a sequence of rephased, matrixed color values pertaining to consecutive scanned elements of the originals.

BRIEF DESCRIPTION OF THE DRAWINGS

The invention will be described in relation to the drawings, wherein.

DETAILED DESCRIPTION OF THE INVENTION

Figure 1:
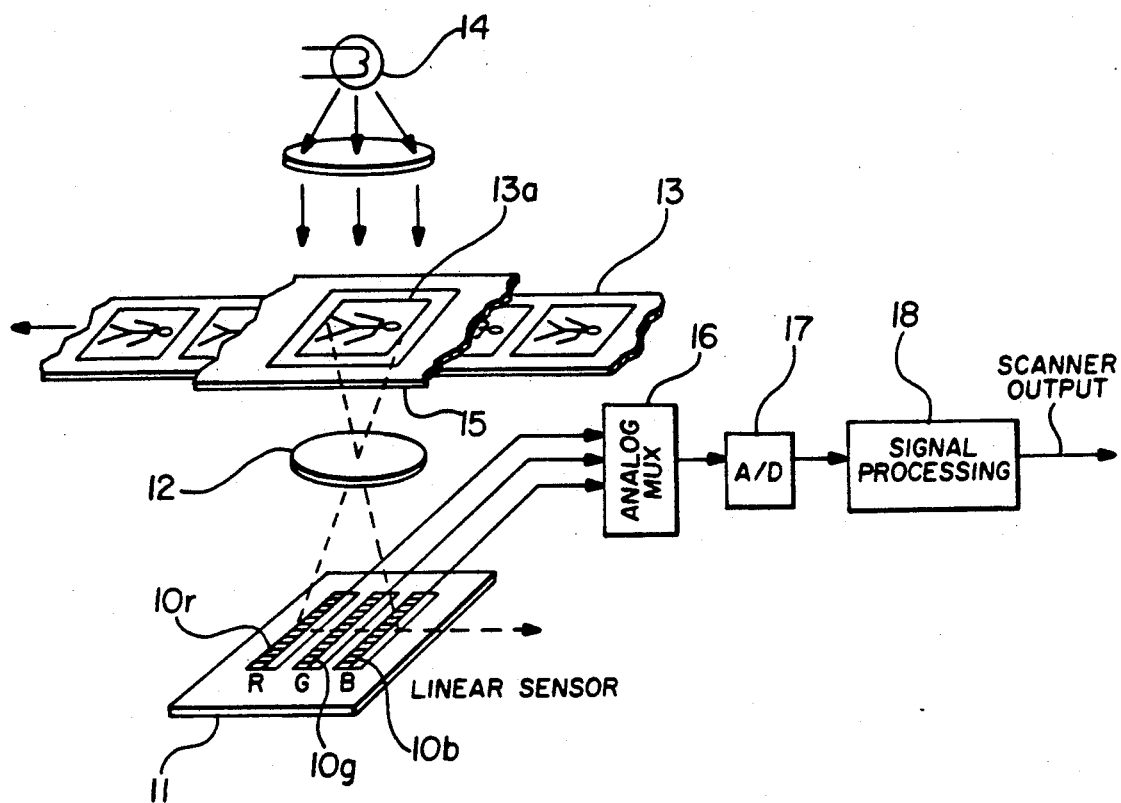
FIG. 1 is a diagram of a linear scanning system known generally in the prior art.
Figure 2:
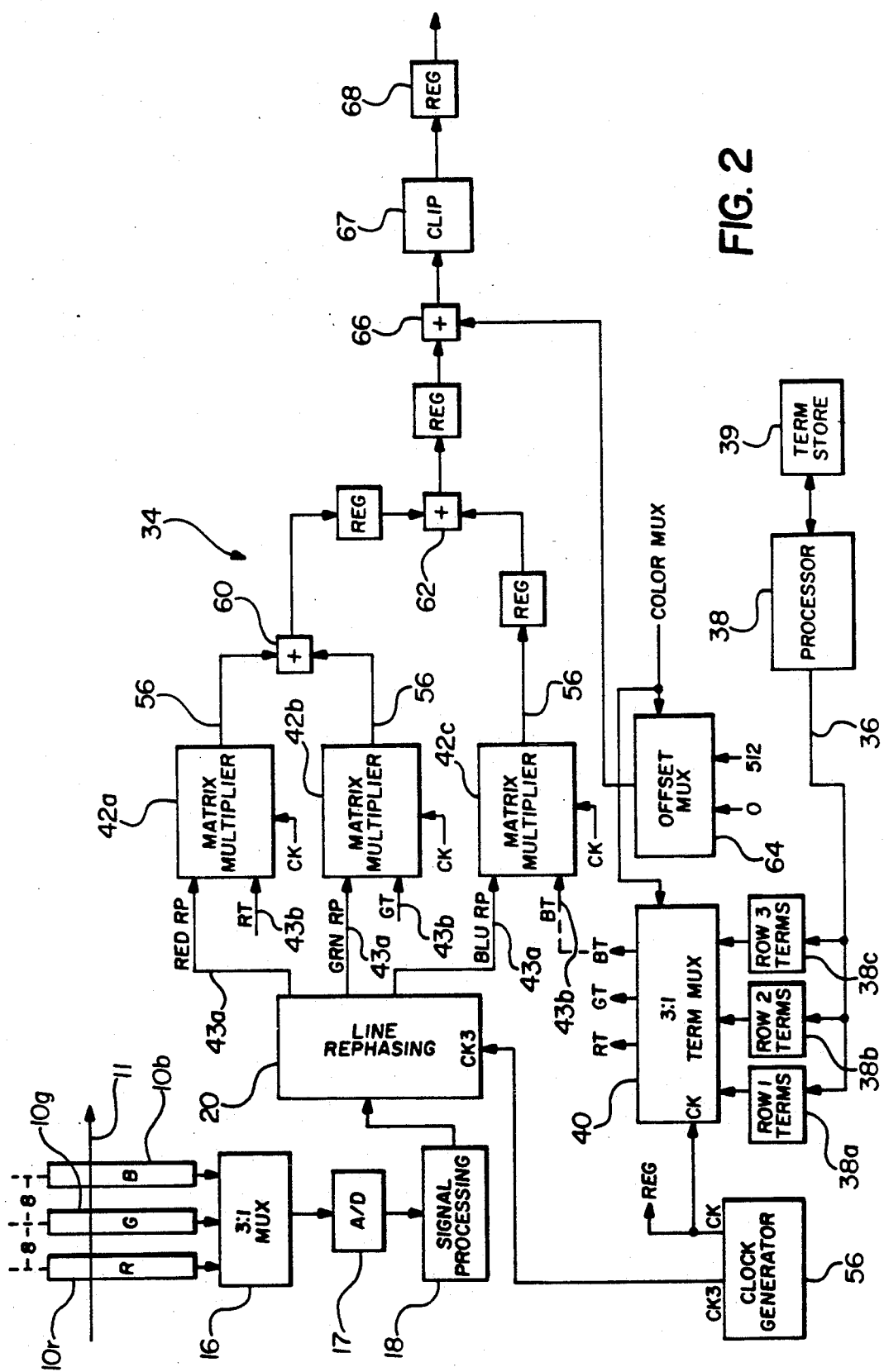
FIG. 2 is a block diagram of a digital matrix circuit combining a line rephasing section and a matrix multiplication section according to the invention.

Details of the color matrix circuit according to the invention are shown in FIG. 2. The linear sensors 10r, 10g, and 10b are oriented perpendicular to a page direction scan of an original, as shown by an arrow 11. As was the case in FIG. 1, red, green, and blue image signals are clocked from the sensors in a conventional manner, applied to the multiplexer 16, digitized by the A/D converter 17 and processed for black level correction and the like in the signal processing section 18. According to this arrangement, the linear sensors 10r, 10g, and 10b provide image signals to the multiplexer 16 in three parallel channels. The image signals thus arrive at the multiplexer 16 aligned in the line scanning direction, that is, the RGB signals pertain to the same linear position on the sensors. The image signals, however, are spatially displaced in the page scanning direction by the illustrated line separation, that is, the center lines of sensors 10r and 10g, and 10g and 10b, are separated by 8 lines, and the sensors 10r and 10b are separated by 16 lines. Consecutive RGB image signals output by the multiplexer 16 thus pertain to different elements in the original.

Figure 3:
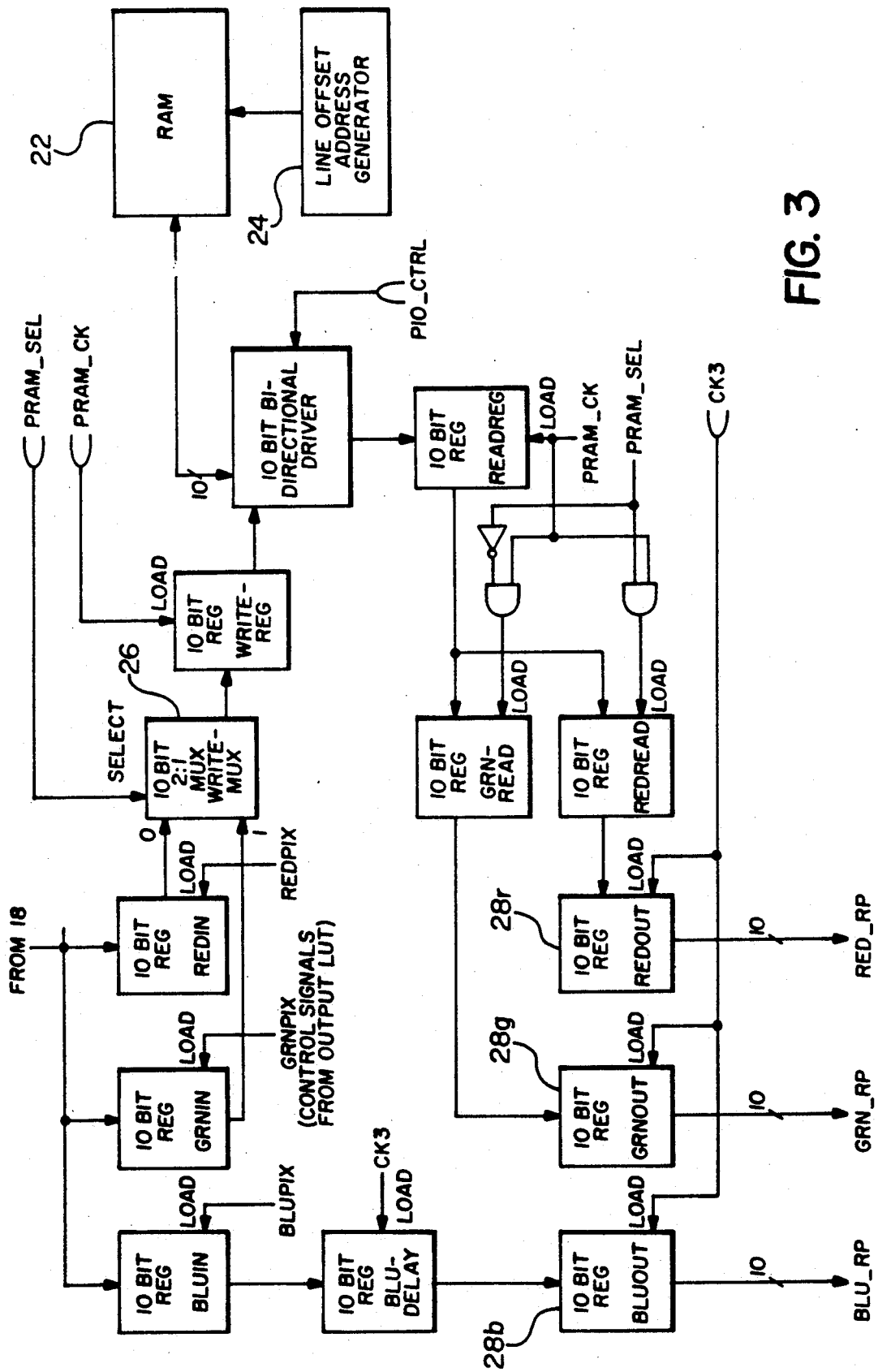
FIG. 3 is a digital circuit diagram of the line rephasing section illustrated in FIG. 2.

Before matrixing, the sequence of image signals from the linear sensors 10r, 10g, and 10b must be rephased in the page direction to provide color values representative of the same picture element on the original. This is done by a line rephasing circuit 20, which is shown in greater detail in FIG. 3. More particularly, an external RAM memory 22 is conventionally addressed to provide the needed delay, as determined by the line offset address generator 24. Longer or shorter delays may be obtained in the usual manner by altering the size of the external RAM 22 and/or the sequence of the RAM addressing. As shown by the arrangement of registers preceding a multiplexer 26, the spatially offset red and green image signals are serially input into the rephasing circuit 20 and multiplexed to the external RAM 22. The RAM 22 imparts a 16 line delay to the red signal and an 8 line delay to the green signal. Each blue signal is applied to the output register 28b, and the appropriately delayed red and green signals are withdrawn from the external RAM 22 and applied to the respective output registers 28g and 28r. At this stage, the three color signals in the registers 28r, 28g, and 28b are rephased in the page scanning direction and now pertain to the same scanned element of the original.

Referring again to FIG. 2, a 3×3 color matrix 34 is implemented using a 1×3 serial architecture, which computes one matrix row at a time. The matrixing operation is given by the equation (1)

$$\begin{bmatrix} R_o \\ G_o \\ B_o \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R_i \\ G_i \\ B_i \end{bmatrix} + \begin{bmatrix} O_1 \\ O_2 \\ O_3 \end{bmatrix} \quad (1)$$

where $R_i$, $G_i$ and $B_i$ are input signals; $a_{11} \ldots a_{33}$ are the matrixing coefficients; $R_o$, $G_o$, and $B_o$ are the matrixed output signals; and $O_1$, $O_2$, and $O_3$ are offset coefficients. The matrix coefficients $a_{ij}$ are 8 bit sign magnitude format numbers in the range, e.g., of $\pm 127/64$. The offset coefficients $O_i$ are set to either the numeral 0 or the numeral 512 (the purpose of the offset coefficient will be explained later). The matrix coefficient values are programmable from a processor 38 through a bus controller interface 36 with three registers 38a, 38b, and 38c. The coefficient values for row 1 are selected by the processor 38 from a coefficient memory 39 and stored in the register 38a, the coefficient values for row 2 are stored in register 38b, and the coefficient values for row 3 are stored in register 38c. The coefficient values are switched to the matrix circuit 34 by a multiplexer 40, which switches in row sequence between the red (first) row coefficient values, the green (second) row coefficient values, and the blue (third) row coefficient values stored respectively in registers 38a, 38b, and 38c. The outputs RT, GT, and BT from the multiplexer 40 thus represent the three coefficient values (for one row of a 3×3 matrix) contained in a selected one of the registers 38a, 38b, or 38c.

The three terms of each matrix row are computed in parallel using three multipliers 42a, 42b, and 42c, that is, each multiplier does one coefficient multiplication for each three term row sum, as follows:

|  |  | matrix multipliers |  |  |  |  |
|---|---|---|---|---|---|---|
|  |  | 42a |  | 42b |  | 42c |
| $R_o$ | = | $a_{11}R_i$ | + | $a_{12}G_i$ | + | $a_{13}B_i$ |
| $G_o$ | = | $a_{21}R_i$ | + | $a_{22}G_i$ | + | $a_{23}B_i$ |
| $B_o$ | = | $a_{31}R_i$ | + | $a_{32}G_i$ | + | $a_{33}B_i$ |

Figure 4:
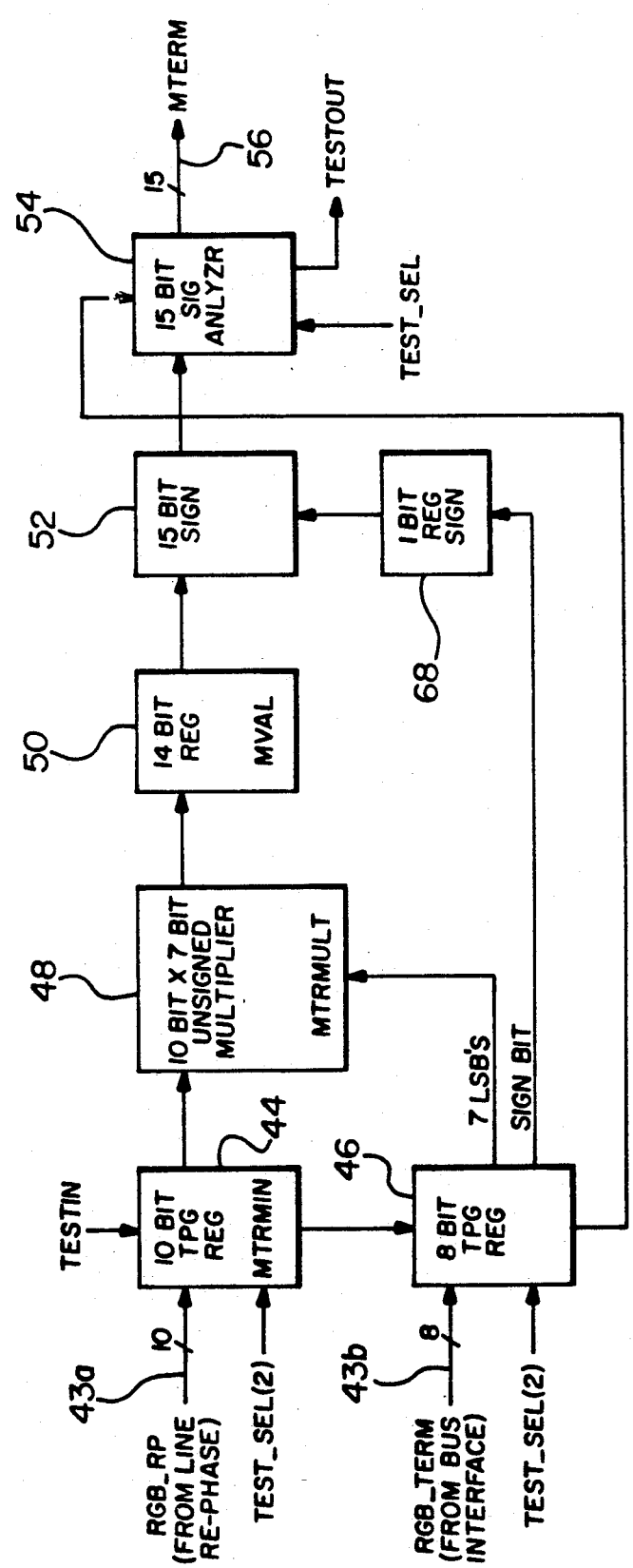
FIG. 4 is a digital circuit diagram of one of the matrix multipliers incorporated in the matrix multiplication section illustrated in FIG. 2.

As shown in FIG. 4, each multiplier 42a, 42b, or 42c has a first 10 bit unsigned input 43a for the pixel values and a second 8 bit signed input 43b for the coefficient values. Both signals are latched into respective scan test registers 44 and 46 and applied therefrom to an unsigned multiplier 48. The result is latched into the register 50 and the sign bit (depending on the coefficient sign) is added in the sign element 52. Before being output on an output port 56, the multiplied value is applied to a signature analyzer 54, which along with the scan test registers 44 and 46 perform a testing operation that will be explained later. When the coefficient multiplications of the first row are completed, the terms are added together in adders 60 and 62 (FIG. 2) to produce a matrix row sum. As this computation was progressing, the next three coefficients from, e.g., the second row register 38b were latched into the respective registers 46 of the multipliers 42a, 42b, and 42c and a computation was initiated for the second row. Likewise, as the second row sum is progressing, the third row multiplication is initiated, and so on. In operation, therefore, the second input 43b of each multiplier receives a repetitive sequence of coefficient values pertaining to the same column position for consecutive rows of the matrix.

Figure 5:
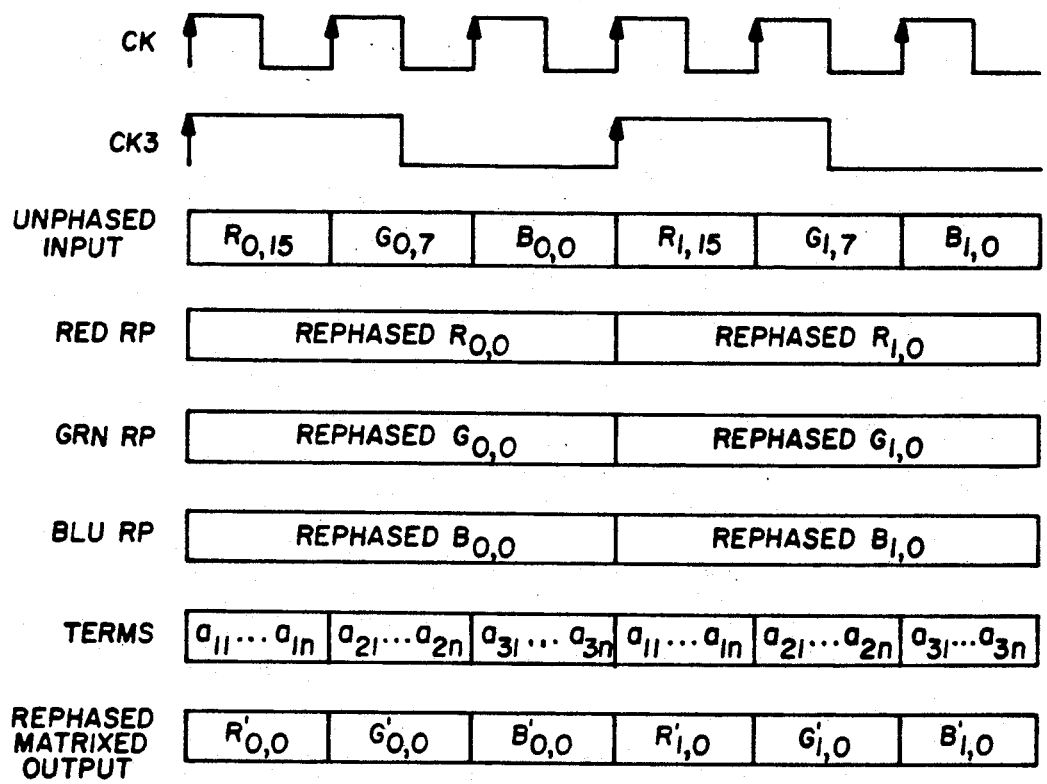
FIG. 5 shows waveforms and operational sequences helpful in understanding the diagrams illustrated in FIGS. 2-4.

For these multiplications and row sums to be pipelined as described, the red, green, and blue rephased color values are held on the respective first inputs 43a of the multipliers 42a, 42b, and 42c for the duration of the three row computations. This requires two different clock rates. More specifically, a clock generator 56 generates a clock signal CK at the pixel processing rate and a clock signal CK 3 at one third the frequency of the signal CK. The respective clock waveforms are shown in FIG. 5. The clock signal CK changes at the rate the pixel information is pipelined through the signal processing section 18 and, except as to be noted, through the digital matrix circuit 34. The clock signal CK 3 is applied to the line rephasing circuit 20 (to the output registers 28r, 28g, 28b in FIG. 3) to change the red, green, and blue color values input to the matrix circuit 34 at a submultiple, i.e., one third, of the pixel rate so that the three multipliers 42a, 42b, and 42c can be used in a pipelined fashion to calculate the nine product terms of the (3×3) matrix at the pixel rate. This means that each digital color value applied to the first inputs 43a of the multipliers 42a, 42b, and 42c is multiplied three times within one cycle of the clock CK 3 to obtain the three row contributions of each of the output color signals. This is seen in the diagrams of FIG. 5, where the red, green, and blue rephased signals are held for the duration of a clock CK 3 cycle while the coefficient terms are changed for every cycle of the clock CK.

To recap, the three matrix row sums are computed sequentially using the three multipliers 42a, 42b, and 42c. The coefficients of a selected row, e.g., referring to equation (1), the coefficients $a_{11}$, $a_{12}$, and $a_{13}$ of the first row, are applied to respective second inputs 43b of the multipliers 42a, 42b, and 42c. At the same time, the rephased red, green, and blue signal values are applied to the first inputs of the respective multipliers 42a, 42b, and 42c. Therefore, the multiplier 42a generates the result $a_{11} R_i$, the multiplier 42b generates the result $a_{12} G_i$, and the multiplier 42c generates $a_{13} B_i$. The first row sum is then completed by the adder 60 (which generates $a_{11}R_i + a_{12}G_i$) and the adder 62 (which generates all $R_i + a_{12} G_i + a_{13} B_i$). The processing is pipelined so that as adder 60 is forming the sum $(a_{11}R_i + a_{12}G_i)$, the coefficients $a_{21}$, $a_{22}$, $a_{23}$ of the second row are applied to the second inputs of the multipliers 42a, 42b, and 42c. With the same red, green, and blue values still applied to the first inputs thereof, the second row sum is produced. Then, while adder 62 generates the sum $(a_{11}R_i + a_{12}G_i + a_{13}B_i)$, the third row multiplications are generated by applying the third row coefficients $a_{31}$, $a_{32}$, $a_{33}$ to the respective second inputs with the same color values remaining on the first inputs. Next, a new set of red, green, and blue color values are applied to the first inputs of the multipliers 42a, 42b, and 42c, and the process is repeated.

An offset decimal value 512 may be selected by a multiplexer 64 and added to the matrixed sum signal in an adder 66. Decimal 512 in this embodiment is equal to one half of the positive full scale value. This is needed in particular if the matrix is used to compute color difference signals (R-Y, B-Y), which are ordinarily allowed to take on negative values (depending in the relative values of R, B, and Y). Addition of the offset sets the zero signal level at decimal 512, which prevents clipping of all of the negative color difference signals when the output signal is applied to a clipping circuit 67. When the multiplexer 64 selects offset=0, the adder output is just equal to the sum value at its input. This allows the matrix to operate as an RGB to RGB matrix or as an RGB to $C_1 Y C_2$ matrix, where the $C_1$ and $C_2$ terms are color difference signals such as R-Y, B-Y video signals.

Figure 6:
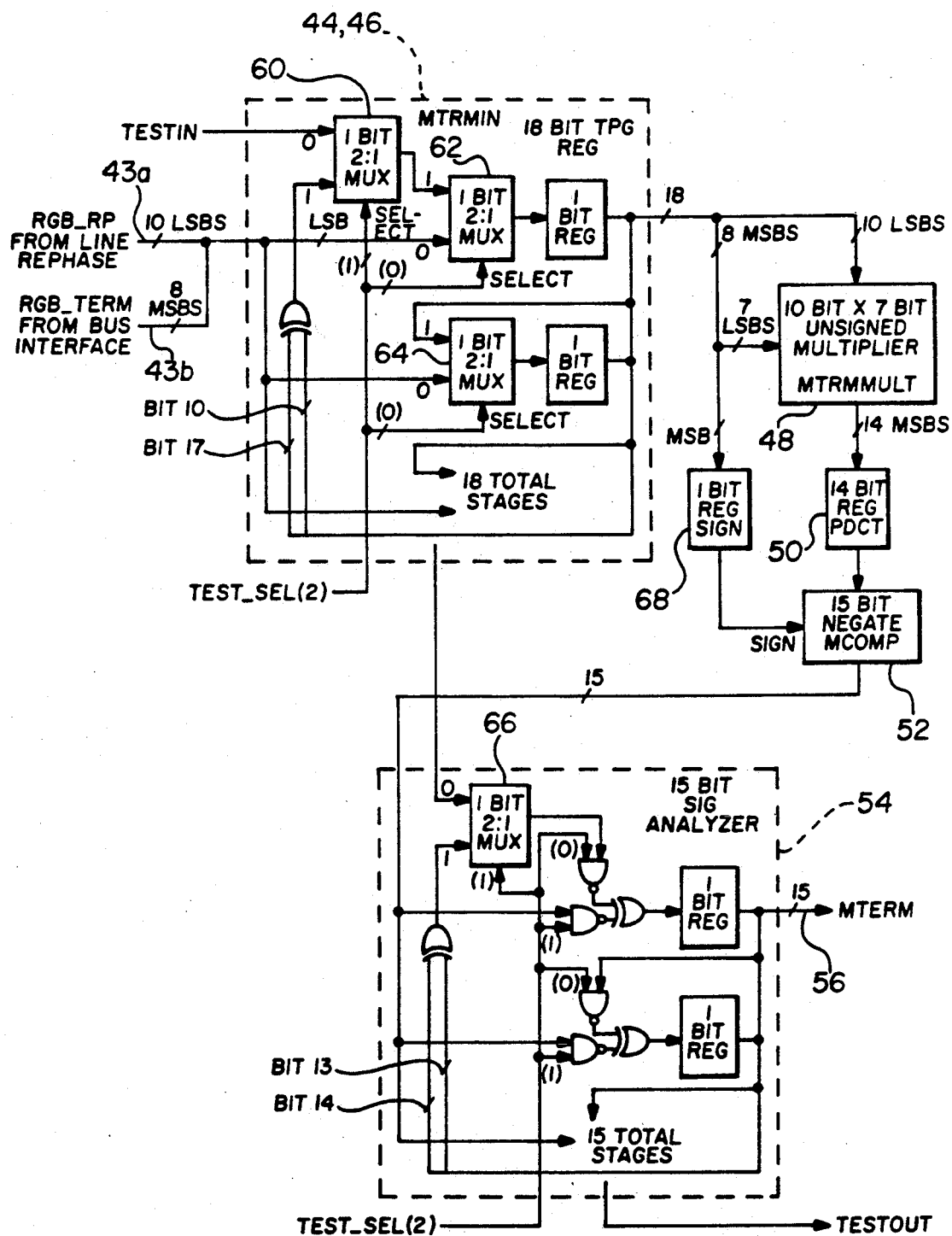
FIG. 6 shows further detail of the circuit diagram of FIG. 4 as used in a self test operation.

The multiplier of FIG. 4 furthermore incorporates a special self-testing mode, which can be understood by reference to FIG. 6. The registers 44 and 46 taken together form an 18 bit TPG (Test Pattern Generator) register. This is a linear feedback shift register, capable of generating the set of ($2^{18}-1$) possible bit patterns (the all zero pattern is excluded) in a pseudo random sequence. When TEST—SEL(2)=2 the register operates like a normal static register with bit multiplexers 62 and 64 selecting the 18 bit input. With TEST—SEL(2)=1, the register operates like a normal scan register. A LSB test multiplexer 60 selects the TESTIN input to be shifted into the LSB and the bit multiplexers 62 and 64 select the previous bit, thus shifting the contents 1 bit towards the MSB. With TEST—SEL(2)=3, the register 44, 46 operates as a linear feedback shift register. The bit multiplexers 62 and 64 select the previous bit as in scan mode, however the LSB test multiplexer 60 selects the exclusive OR of bits 10 and 17 to shift into the LSB position.

The signature analyzer register 54 is similar to the TPG register 44, 46. With TEST—SEL(2)=2, or 1 it operates as a normal static register or a scan register respectively. With TEST—SEL(2)=3, an LSB test multiplexer 66 selects the feedback bit which in this case is the exclusive OR of bits 13 and 14. The difference is that instead of only shifting the register outputs one bit towards the MSB, the shifted bit pattern is exclusive OR'ed with the input bit pattern. Thus, different input sequences will produce different "signatures" after some number of clock cycles The combination of the TPG register 44, 46 and the register 54 is used to perform an exhaustive test of the circuits placed between them, in this case, the multiplier 48 the registers 50 and 68 and the complementing circuit 52. An initial pattern is loaded into the TPG register by using it in scan mode. It is then placed in TPG mode and clocked $2^{18}$ times, generating all input combinations except the all zeros pattern. The circuit is then placed in scan mode, and the "signature" stored in the register 54 is read out. Simulation is used to determine the correct signature for a given starting pattern and circuit.

Two additional signature analyzer registers (not shown) may be used in the matrix circuit (FIG. 2). While the multipliers are being tested exhaustively two additional signatures are obtained. One follows the RGB adder 62, the other follows the 2's complement clip 67. These signatures will also be compared against simulation results.

The invention has been described in detail with particular reference to a presently preferred embodiment, but it will be understood that variations and modifications can be effected within the spirit and scope of the invention. For instance, it should be clear that matrix multiplications of greater or lesser size may be handled by additional or fewer multipliers 42. It also should be clear that the clock submultiple driving the output of the rephasing circuit 20 is a function of the number of matrix rows that must be computed just as the number of multipliers 42 is a function of the number of terms in a row, or, the number of columns in the matrix. Thus, for a (m×n) matrix, a submultiple of 1/m times the pixel clock will load the rephased signals into n multipliers.

What is claimed is:

1. A signal processing circuit for processing digitized image signals representative of a plurality of colors serially output from a like plurality of linear color sensors arranged to scan an original, said sensors providing lines of image signals separated by a predetermined number of scan lines in a page scanning direction, said circuit comprising:

means for serializing and digitizing the image signals from the linear color sensors to form consecutive, offset digitized image signals that represent scanned picture elements that are linearly aligned but spatially offset by the spatial displacement of the sensors;

line rephasing means for realigning the digitized, offset signals from the linear sensors and providing sets of rephased color values corresponding to spatially-coincident scanned picture elements of the original;

means for storing coefficient values for an (m×n) order matrix for computing a plurality of color-corrected values including at least one difference value;

multiplying means having first input means for receiving said rephased color values and second input means for receiving said coefficient values, said multiplying means driven at a predetermined pixel processing rate to generate a plurality of matrix product terms of respective values input through said first and second input means;

means for transferring rows of said coefficient values from said storing means to said second input means at said pixel processing rate and for applying said rephased color values to said first input means at a submultiple of said pixel processing rate, whereby the matrix product terms for each row are computed in parallel by said multiplying means;

means for combining the matrix product terms provided by said multiplying means to provide a reserialized sequence of matrix row sum signals representative of the color-corrected values including at least one difference value, corresponding to spatially coincident scanned picture elements of the original, whereby the serial matrix row sum signals are provided in pipelined row-sequential order for each scanned picture element of the original; and means for adding a fixed, unchanging offset decimal value to the matrix row sum signal producing the difference value, said offset adding means thereby shifting the zero signal level of the difference value whereby the corresponding row sum signal will not become negative.

2. A signal processing circuit as claimed in claim 1 wherein said multiplying means comprises n multipliers, each receiving on said second input means thereof a particular one of the coefficients of a selected row.

3. A signal processing circuit as claimed in claim 2 wherein the submultiple clock rate is equal to 1/m of said pixel processing rate.

4. A signal processing circuit as claimed in claim 3 wherein said combining means includes means for adding the outputs of said n multipliers to form a matrix row sum signal.

5. A signal processing circuit as claimed in claim 1 further including means subsequent to the offset addition means for clipping the row sum signal.

6. A signal processing circuit as claimed in claim 1 wherein said multiplying means includes testing means for cycling a set of random numbers through both inputs of said multiplying means and signal analyzing means for examining the product generated by said multiplying means for faults in the multiplying circuit.

* * * * *